Nov. 17, 1964 C. H. STAPPER, JR., ETAL 3,157,857

PRINTED MEMORY CIRCUIT

Filed Sept. 29, 1961 2 Sheets-Sheet 1

INVENTORS
CHARLES H. STAPPER JR.
LAWRENCE E. LAFAVE
BY Wesley De Bruin
ATTORNEY

Nov. 17, 1964 C. H. STAPPER, JR., ETAL 3,157,857

PRINTED MEMORY CIRCUIT

Filed Sept. 29, 1961 2 Sheets-Sheet 2

United States Patent Office 3,157,857

Patented Nov. 17, 1964

3,157,857

PRINTED MEMORY CIRCUIT

Charles H. Stapper, Jr., Fishkill, and Lawrence E. La Fave, Poughkeepsie, N.Y., assignors to International Business Machines Corporation, New York, N.Y., a corporation of New York Filed Sept. 29, 1961, Ser. No. 141,860
6 Claims. (Cl. 340—173)

This invention relates to memory apparatus and, more particularly, to memory arrays fabricated in accordance with printed circuit techniques and incorporating bistable semiconductor devices, such as tunnel diodes, as the storage elements.

Tunnel diode memory arrays have been proposed in which the individual memory cells are ferrite core coupled to the cell selection lines. Such arrays operate with limited memory capacity as well as reduced memory operating speeds due to the interaction between the selection lines and the memory cell components and the time delays resulting from this interaction. Moreover, the ferrite cores employed as couplers act as inductances which combine with the cross winding capacitances to constitute a lumped parameter transmission line acting as a low pass filter to provide distortion of the pulses delivered along the selection lines from appropriate driver circuits.

Accordingly, it is a primary object of the invention to provide matrically arranged memory apparatus having bistable semiconductor storage elements coupled to drive means by printed circuit techniques.

It is another object of the invention to provide memory apparatus in which the utilization of printed circuit techniques in the fabrication of the access means to the individual memory cells brings about a substantial reduction in the space required for such apparatus, as well as the number of components which must be employed therein.

It is a further object of the invention to provide memory apparatus having storage elements coupled by printed circuit techniques to the memory driver circuits, in a manner, such that impedance compatibility is achieved between the coupling means and the individual memory cells and existing driver circuits.

It is still a further object of the invention to provide memory apparatus having printed circuit coupling means to provide for the elimination of cross coupling between selection lines and the delivery of distortionless high speed selection pulses to the cells of the memory.

A more specific object of the invention is to provide a memory array employing printed circuit means for coupling appropriate drive circuitry to each memory cell having a tunnel diode as a storage element and an impedance which may also be fabricated in printed circuit manner for adjusting the operating characteristic of the diode.

In accordance with an aspect of the invention, memory apparatus is provided, having a plurality of X and Y lines coupled to appropriate drive circuitry and arranged in matrical manner to provide a plurality of intersecting cross points. A memory cell is located at each cross point which includes a bistable semiconductor storage device connected to a current source and an impedance element for adjusting the operating characteristics of the storage device. The coupling lines are formed in printed circuit laminations which couple into each cell in an inductive manner by sets of printed memory conductors of whirl formation to render each memory cell at a cross point subject to the drive circuits coupled to the respective X and Y lines.

The foregoing and other objects, features and advantages of the invention will be apparent from the following more particular description of preferred embodiments of the invention, as illustrated in the accompanying drawing, wherein:

Figure 6A:
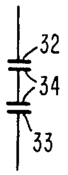
FIG. 6 is a schematic view of one embodiment of a printed circuit version of a capacitative element for use as the impedance element in the memory cells of the invention.
Figure 7:
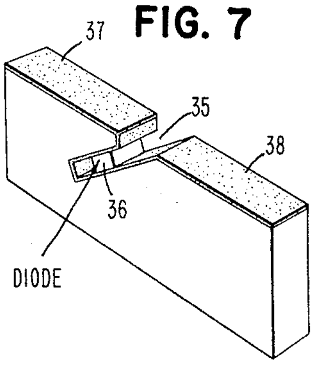
Figure 6:
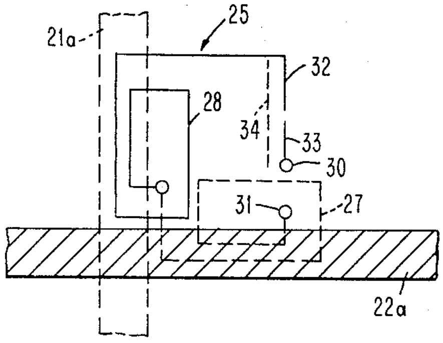

FIG. 6*a* is a circuit diagram of the electrical equivalent circuit of the capacitive element according to FIG. 6; and FIG. 7 is a perspective view of a second embodiment of a printed circuit version of a capacitative element for use as the impedance element in the memory cells of the invention.

Figure 1:
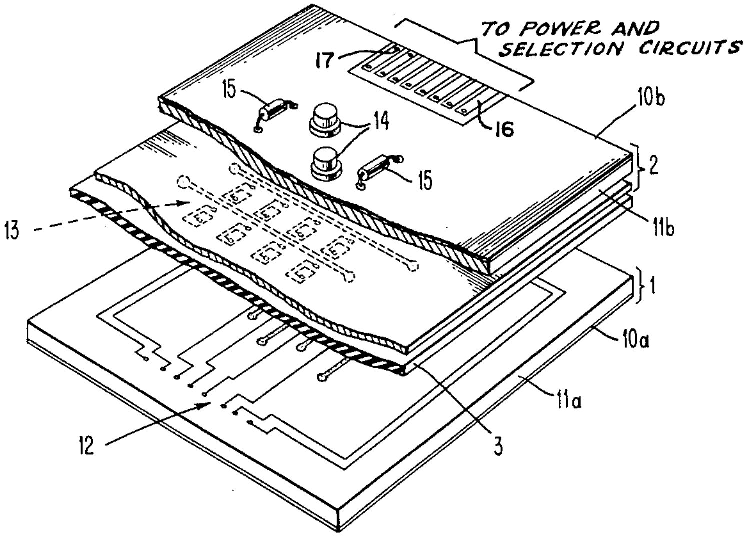
FIG. 1 is a partially exploded view of a printed circuit arrangement of memory apparatus incorporating the features of the invention.

Referring now to FIG. 1, the memory apparatus, according to the principles of the invention, comprises a pair of printed circuit cards 1–2, each of which consists of laminations of a number of related layers. The outermost layer of each card is a ground plane 10*a–b*, which is formed of a conductive material, such as gold-plated copper. Affixed to the ground plane of each card by conventional printed circuit techniques is a dielectric layer 11*a–b*. The dielectric layer is preferably about .03 inch thick and may be formed of a material such as Teflon having a dielectric constant of approximately 2.0. Alternatively, a material having a higher dielectric constant, such as epoxy paper (dielectric constant 3.8–3.9), may also be employed. A third laminated layer or the innermost layer of each printed circuit card 1–2 comprises a conductive material, such as copper, which is arrayed in the specific patterns generally indicated at 12–13, respectively. From the description which follows hereinafter, it will be apparent that the complete coupling and cell circuitry of the apparatus is contained in the two patterns.

The printed circuit cards 1–2 are arrayed for mounting such that the conductive circuitry patterns 12–13 lie in face-to-face relationship. Separating the two cards is a thin dielectric layer 3 of a few mils' thickness for insulating one conductive pattern from the other. As is obvious, the conducting lines of the two patterns 12–13 are arrayed to enable the lines of each pattern to intersect the lines of the other pattern. For optimum memory operation, it is preferred that the patterns are mounted in orthogonal relationship with respect to each other so as to form a matrical arrangement of individual cells. Each cell is located at the intersection of a line of one pattern with an orthogonally disposed line of the other pattern and each cell includes a portion of the conductive pattern of each card.

Figure 2:
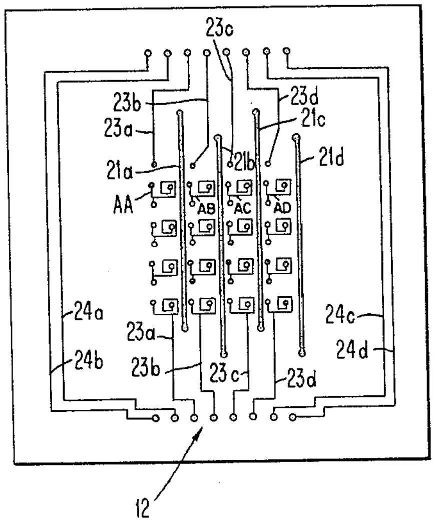
FIG. 2 is a top view of one of the printed circuit cards, as arranged in the view of FIG. 1, showing one portion of the conductors of the apparatus.
Figure 3:
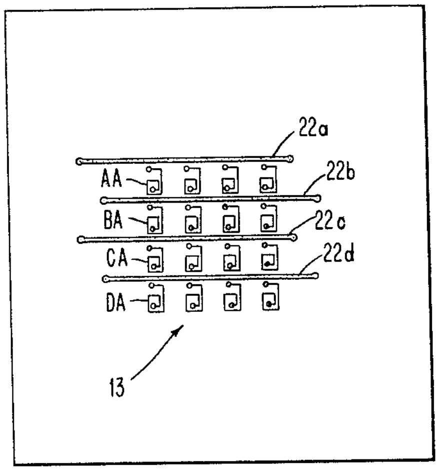
FIG. 3 is a bottom view of a second of the printed circuit cards, as arranged in the view of FIG. 1, showing a second portion of the conductors of the apparatus.

As shown in FIGS. 2 and 3, the conductive patterns 12–13 each comprise a plurality of driver or selection pulse coupling lines. The lines 21*a*–21*d* of the pattern 12 are referred to as the Y selection lines and are coupled to the Y selection circuits (not shown), and the lines 22*a*–22*d* of the pattern 13 are designated as the X driver or selection lines and are coupled to the X selection circuitry (not shown). In each instance a plurality of whirl or spiral conductive formations, for example AA–AD and AA–DA, are associated with a given drive line. Thus, when the selection lines of the two patterns are orthogonally arranged in face-to-face relationship, the memory cell formed at the intersection of each X line and each Y line has a whirl formation from each pattern associated with it. It is obvious, of course, that the pattern 13 is inverted from its FIG. 3 position, when the elements are arranged in stacked relationship, as shown in FIG. 1.

Each whirl formation has a plurality of coupling connections which are depicted as the apertures of the whirl formations. The active cell components, such as the tunnel diodes 14 and the resistors 15, are connected in the patterned circuit arrangement of the memory array through these conductive coupling apertures, which extend through the printed circuit cards so as to be insulated from the ground planes 10*a*–*b*. In this manner, the components are mounted at the outer surface of the apparatus (as shown in FIG. 1), and are separated from the selection lines and whirl formations by the dielectric layers 11*a*–*b*, enabling any interaction between the components and circuitry occurring during the operation of the apparatus to be substantially reduced. It is obvious, of course, that the ground planes 10*a*–*b* are not necessary for the operation of the apparatus but are provided to enhance the operation by decoupling the cell components from the coupling circuitry.

The employment of printed circuit techniques also enables provision to be made at the edge of the printed circuit card for a number of electrical surface connectors 16, which are electrically insulated from one another and from the ground planes. Each connector 16 has at least one conductive coupling aperture, for example 17, connecting a particular conductive strip to the memory patterns 12–13, thereby permitting appropriate biasing and selection circuitry to be connected to the memory apparatus.

Referring again to FIGS. 2 and 3, some of the whirl formations of the pattern 12 are provided with a third coupling aperture, whereas the pattern 13 is provided with only two such apertures in each whirl formation. The purpose of the additional aperture in the whirl formations of the pattern 12 is to provide for the serial connection of the bias supply to each column of the array. In this respect, conductive lines 23*a*–23*d* are provided for connecting respective current supplies to each column of whirl formations. The connection from whirl formation to whirl formation is achieved by the storage element or tunnel diode for that cell. In this manner, the bias current is applied to each cell, in turn, in a particular column. For a two dimensional array, current return to the respective current supplies can be effected through one of the ground planes. However, in a three dimensional memory conductive lines, such as 24*a*–*d* may be provided as a return connection from each one of these columns to the respective current supply.

Figure 4:
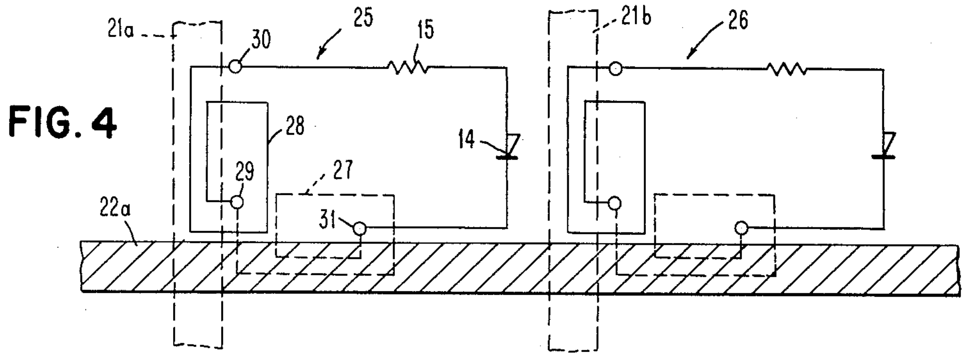
FIG. 4 is a schematic of a portion of the memory apparatus showing the relationship of the elements of the memory cells and selection lines.

Referring now to FIG. 4, the intersecting selection lines and associated whirl formations for a portion of the memory array are schematically shown with the Y selection lines 21*a* and 21*b* indicated in dotted lines as being orthogonally intersected by an X selection line 22*a*, so that the memory cells, generally indicated at 25–26, are formed. In order to simplify this schematic, the conductor lines 23*a*–23*d* and 24*a*–24*d*, normally employed in applying bias current to each of the cells, are not indicated in this figure; it should be understood, however, that an arrangement such as described herein is provided to bias each of the memory cells. Moreover, it is apparent that the Y selection lines are insulated from the X selection line by the thin dielectric layer 3.

The whirl formation 27, as shown in dotted lines, provides an inductive coupling from the X selection line 22*a* to the cell 25, and, similarly, the whirl formation 28 inductively couples the Y selection line 21*a* to the cell 25. The whirl formations 27–28 are electrically connected through the common overlapping conductive apertures 29. The additional coupling apertures 30–31 are provided, so that the components of the memory cell may be connected into the circuit. As shown, the tunnel diode 14, which is employed as the storage element for the cell and the resistor 15, are connected in series between the apertures 30–31.

The circuitry of the cells and the array of this invention are described with more particularity in copending application Serial No. 104,274, filed April 20, 1961, in the names of W. D. Pricer and H. P. Wolff and assigned to the same assignee as this invention. Since this invention is directed to the printed circuit implementation of circuitry such as disclosed in this copending application, it is not deemed necessary to elaborate on the circuitry or operation of the apparatus, reference being had to that application for such a description.

Briefly, however, for an understanding of the relationship of the elements of this invention, the array is operated when selection pulses are supplied by appropriate X and Y driver or selection circuits (not shown) to a cell along coincident selection lines. For example, if it is assumed that the tunnel diode 14 of the cell 25 is in its low voltage-high current stable state of operation or binary "0" information state, it may be switched to its binary "1" state by the application of coincident positive selection pulses to the selection lines 21*a* and 22*a* so that they may be inductively coupled through the whirl formations 27–28, respectively, to be linearly added and applied to the diode 14. The diode then switches to its high voltage-low current state of operation. In similar manner, the tunnel diode may be switched from its binary "1" state to its binary "0" state. As described in the aforementioned copending application, appropriate sensing means may be connected to the cell to sense these changes of state.

Figure 5:
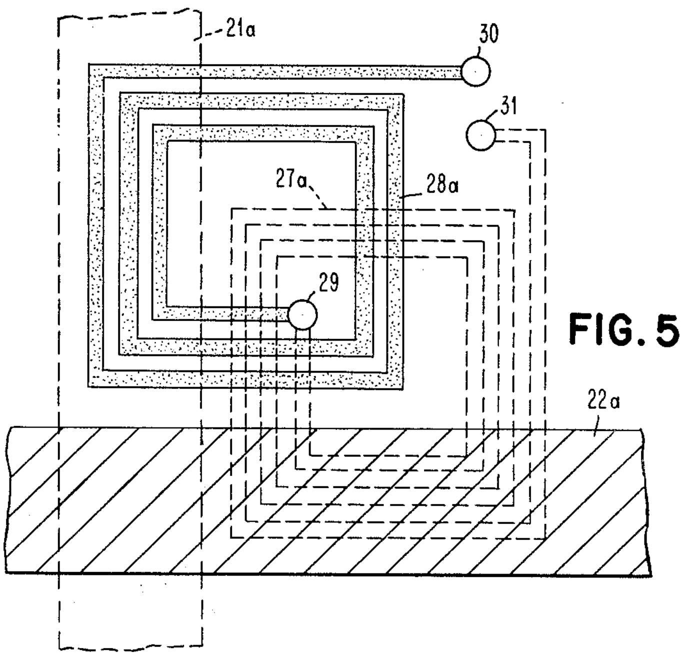
FIG. 5 is a schematic view of a second embodiment of an inductive coupler for use in the apparatus of the invention.

As shown in FIG. 4, the whirl formations 27–28 for inductively coupling the selection pulses to the memory cells are formed of one and one-half conductive turns each. By employing such a configuration for each of the whirl formations, the speed of the selection pulses, and thus the induced voltages, is made to approximate the potential switching speed of the tunnel diode storage element in a cell. It is readily apparent, however, that the invention is not so limited and the number of turns in each whirl formation may be increased or decreased to either retard or advance the speed of the selection pulses. Thus, as shown in FIG. 5, the number of turns for each of the whirl formations 27*a*–28*a* is increased to three and one-half turns. The increased number of turns has the effect of retarding the speed of the selection pulses; the induced voltages, and, therefore, the switching of the cell.

Referring again to FIG. 4, the selection lines are straight, intersecting each other perpendicularly. The effect of this arrangement is to substantially reduce the interaction between adjacent lines as well as the discontinuities normally occurring when the selection lines are of other geometries, such as those utilized in conventional core coupling arrays. When these effects are coupled with the rapid field attenuation achieved in a direction lateral to the selection lines due to the use of the ground planes 10*a*–*b*, a minimum of pulse distortion and a maximum pulse propagational velocity are obtained. Both of these results are essential for the proper operation of the conventional current supplies utilized with tunnel diode memory arrays. Moreover, the printed circuit implementation of the selection lines provides for an added advantage for the apparatus, since the thickness of the lines may be readily controlled. The characteristic impedance of a line depends on its thickness and, therefore, by merely varying the thickness of the lines, a particular characteristic impedance can be chosen.

Although the impedance element for the memory cells has been shown and described as a resistor, it is readily apparent that other types of impedance elements may be employed for adjusting the operating characteristics of the tunnel diode of a cell. The use of such elements does not constitute a part of this invention, which is directed to the fabricaton of memory apparatus in accordance with printed circuit techniques. However, these elements may include backward diodes or capacitors. Thus, as shown in FIG. 6, a capacitive element is illustrated as being formed in printed circuit manner for utilization as the impedance element in the memory cell 25 of FIG. 4.

The selection lines 21*a*–22*a* are inductively coupled to the memory cell 25 by the whirl formations 27–28, respectively, and the tunnel diode storage element (not shown) is inserted at the coupling apertures 30–31. Conductive lines 32–33, which are formed on one conductive pattern, and conductive line 34, which is printed on the other conductive pattern, comprise the capacitive element of the cell 25; the two patterns being separated by a thin dielectric layer. As shown in FIG. 6*a*, the electrical equivalent of this capacitive arrangement is two series connected capacitors having a common plate 34.

Alternatively, the capacitive element for a memory cell may be formed by fabricating the header portion of the tunnel diode package of conductive material. As shown in FIG. 7, the tunnel diode package has a wedge-shaped gap 35 formed in the header portion and the tunnel diode 36 is inserted in the gap. The header portions 37–38 at either side of the gap are formed of conductive material to act as one portion of the capacitive element and to capacitively couple the tunnel diode into the cell, when the package is positioned to lie in face-to-face relationship with a portion of the whirl formations for a cell. This portion of the whirl comprises the second portion of the capacitive element; the two portions of the capacitive element being separated by a thin dielectric layer having a high dielectric constant, such as barium titanate. In such an arrangement, one of the ground planes, for example 10*b* is not employed in the apparatus; the tunnel diode packages being connected directly to the appropriate printed circuit pattern.

By employing the principles of this invention in tunnel diode memory apparatus, the use of ferrite cores and the concomitant special core-winding techniques associated with them are eliminated. The memory apparatus is readily manufactured by existing printed circuit techniques resulting in a substantial reduction in the interaction between selection lines. The interaction between the selection lines and the cell components is also reduced due to the action of the ground planes which rapidly attenuate any extraneous signals. Additionally, pulse distortion, which takes place in the core coupled arrays due to the lumped parameter effects, is eliminated. Moreover, the advantage of linear input addition of pulses is obtained in the coupling elements; whereas in core-coupled arrays the cores have a hysteresis loop so that operation on a transition portion of this loop brings about nonlinear operation.

While the invention has been particularly shown and described with reference to preferred embodiments thereof, it will be understood by those skilled in the art that the foregoing and other changes in form and details may be made therein without departing from the spirit and scope of the invention. For example, they are equally applicable for use in two-dimensional or three-dimensional memory arrays. In addition, inhibiting for a three-dimensional array can be accomplished by coupling a third line into the circuit or by bias line strobing. Moreover, the mode of cell selection is not limited to coincident selection as above described, but is equally applicable to other types of selection such as read-only memory applications.

What is claimed is:

1. Printed memory apparatus for storing information in a storage cell mounted exteriorly of the memory apparatus and having a bistable storage device and an impedance element for establishing the operating characteristics of the device, the information being manifested in the form of pulses provided from a plurality of sources to the device, comprising
   means comprising a plurality of laminations of interior printed circuit selection lines coupled to the sources and separated from each other by an insulating layer and interior sets of printed memory conductors of whirl formation in circuit with each other and with the cell for inductively coupling the pulses from the lines to the cell,
   and surface plane shields mounted exteriorly in the laminations enabling the conductors to have electrical connections therethrough for coupling to the cell and for decoupling the selection lines and memory conductors from the device.

2. The apparatus of claim 1, wherein the impedance element is capacitively formed of a portion of the printed memory conductors and is capacitively coupled to the cell by the printed memory conductors.

3. Printed memory apparatus for storing binary coded information in storage cells, the information being provided in the form of pulses from a plurality of pulse sources to a matrical arrangement inluding a plurality of X and Y lines coupled to respective ones of the sources, the lines intersecting each other to form a plurality of locations for the storage cells, each cell including a bistable storage device and an impedance element for establishing the operating characteristics of the device, comprising
   a plurality of laminations of interior printed circuit selection conductors for forming the X and Y lines and an interior set of printed memory conductors of whirl formation in circuit with each device and an impedance element at respective ones of the locations for inductively coupling pulses provided by the sources to the cell,
   an insulating layer positioned between the lamination forming the X lines and the lamination forming the Y lines, and
   a plurality of exterior surface plane shields in the plurality of laminations having coupling connections extending therethrough to the memory conductors.

4. The apparatus of claim 3 wherein the impedance element of each of the storage cells is capactively formed by portions of the whirl formations of each set of printed memory conductors and is capacitively coupled by the memory conductors of each set to the device in its respective cell.

5. The memory of claim 3, wherein the printed selection conductors are linearly formed enabling the X lines to be orthogonally positioned with respect to the Y lines thereby reducing the interaction between adjacent ones of said conductors to provide distortionless pulses at increased propagational velocity from said sources to the cells during operation of said memory.

6. Printed memory apparatus for storing binary coded information in storage cells including bistable storage devices and impedance elements for establishing the operating characteristics of the devices, the information being provided in the form of pulses from a plurality of sources, comprising
   first and second printed circuit cards,
   each of said cards including a plurality of laminations having an outermost surface plane shield, an intermediate dielectric layer and an innermost conductive layer with a pattern of coupling and storage cell circuitry thereon,
   the coupling circuitry being formed of a plurality of selection conductors coupled to the sources for carrying the pulses and the cell circuitry being formed of sets of printed memory conductors of whirl formation inductively coupled to respective ones of the selection conductors and having coupling connections extending through the laminations to the storage devices, an insulating layer, the patterns being disposed so as to lie in face-to-face relationship and separated by the insulating layer permitting the coupling circuitry of the patterns to intersect each other forming locations for the sets of printed memory conductors to be inductively coupled to the selection conductors.

References Cited in the file of this patent

UNITED STATES PATENTS 3,058,099 Williams ---------------- Oct. 9, 1962

OTHER REFERENCES

IBM Technical Disclosure Bulletin, vol. 3, No. 4, September 1960, page 34.